United States Patent [19]
Poole

[11] 3,912,978
[45] Oct. 14, 1975

[54] POWER CIRCUIT INCLUDING CURRENT LIMITING DEVICE FOR AN ELECTRIC VEHICLE

[75] Inventor: Charles W. Poole, Redlands, Calif.

[73] Assignee: Westinghouse Electric Corporation, Pittsburgh, Pa.

[22] Filed: Jan. 6, 1975

[21] Appl. No.: 538,831

Related U.S. Application Data

[63] Continuation of Ser. No. 346,549, March 30, 1973.

[52] U.S. Cl. ............... 317/20; 317/139; 318/422; 323/97
[51] Int. Cl.² ......................................... H02H 9/02
[58] Field of Search ............ 317/13 A, 16, 20, 137, 317/139; 318/349, 421, 422, 516; 180/65 R; 323/97

[56] References Cited
UNITED STATES PATENTS

| | | | |
|---|---|---|---|
| 2,468,609 | 4/1949 | Whitehouse | 318/422 |
| 3,368,109 | 2/1968 | Johansson | 317/20 |
| 3,716,768 | 2/1973 | Mason | 318/422 |

FOREIGN PATENTS OR APPLICATIONS

| | | | |
|---|---|---|---|
| 588,295 | 11/1933 | Germany | 318/421 |

*Primary Examiner*—L. T. Hix
*Assistant Examiner*—Harry E. Moose, Jr.
*Attorney, Agent, or Firm*—H. G. Massung

[57] ABSTRACT

A current limiting device for the power circuit of an electric vehicle is provided. The device consists of a shunt wire of known resistance and a coil of a low power relay, connected in parallel with the shunt. The shunt wire and the low power relay coil are inserted in series with the power circuit which supplies electric current to the drive motor from the batteries of the electric vehicle. Fixed resistors are inserted or deleted from the power circuit to control the amount of load current flowing. The amount of resistance inserted in the circuit is determined by a foot control switch or pedal in the electric vehicle. As the foot pedal is depressed solenoid relays which have normally open contacts in parallel with the load current limiting resistors are energized, thereby closing the contacts and shorting out the associated load resistors of the power circuit. The low power relay coil connected in parallel with the shunt wire has a set of normally closed contacts which are connected in series with the coil of a power solenoid relay, which controls insertion and deletion of one of the current limiting resistors. When a predetermined current maximum is reached the low power relay is actuated, opening the normally closed contacts, and deenergizing the solenoid relay and reinserting one of the fixed current limiting resistors into the power circuit. Reinsertion of the fixed resistor limits the maximum current which can flow in the power circuit. In a modification, a lamp is provided which indicates when the vehicle is being operated in this maximum current condition.

9 Claims, 4 Drawing Figures

POWER CIRCUIT INCLUDING CURRENT LIMITING DEVICE FOR AN ELECTRIC VEHICLE

This is a continuation of application Ser. No. 346,549 filed Mar. 30, 1973.

BACKGROUND OF THE INVENTION

This invention relates to electric vehicles and more particularly to a device for controlling maximum current which can flow in the power circuit of the electric vehicle under overload conditions.

The speed control of electric vehicles is obtained by feeding the current required by the drive motor load, through a series of several fixed resistors. In order to increase speeds the resistors are bypassed in turn, until no resistors are left connected in series in the circuit. As each resistor is bypassed the power rating of the vehicle increases to a maximum when all resistors are shorted out of circuit and maximum load current can flow. The resistors are usually bypassed by means of solenoid operated relay contacts. Each relay has a set of normally open contacts connected in parallel with an associated fixed resistor. As long as the solenoid of the relay is deenergized and the normally open contacts remain open the fixed resistor is connected in series in the power circuit. However, when the solenoid of one of the relays is energized the normally open contacts close and the associated fixed resistor is shunted or bypassed from the power circuit. The closing of the relay contacts is obtained by activating the coil of the solenoid. The coils of the solenoids are connected to a separate electric control circuit and each solenoid coil has its on/off switch in the control circuit. The solenoid coil on/off switches for activating the relay are usually connected mechanically to a switch foot pedal. As the foot pedal is depressed each relay coil is inturn activated until all fixed resistors are bypassed and maximum battery voltage available is then received by the drive motor. This is the conventional solenoid stepped resistor speed control system used on most electric vehicles.

A major fault of the above described system lies in its inability to restrict, to some degree, the excessive high current discharge rates which can be obtained under certain operating conditions. These excessive current discharge rates are detrimental to the batteries, the motor, and the electrical power system.

These overload conditions can occur under various conditions, for example: a common overload situation occurs when the speed control foot pedal is rapidly depressed when the vehicle is stationary. This in effect closes all the normally open solenoid contacts almost instantaneously, thereby dropping full battery voltage across a stationary drive motor, resulting in a momentary extremely high current flow from the batteries. Another common overload condition can occur when the direction of travel of the electric vehicle is reversed before the vehicle is brought to a standstill. In this condition the current flow will be exceptionally high, particularly if the speed control foot pedal is fully depressed during this manuever. Another high current discharge condition can exist if the vehicle is severely overloaded either by carrying or towing excessive loads or climbing steep grades which are beyond the rated capability of the vehicle.

A popular prior art method used to control overload current flowing during rapid acceleration is to apply a time delayed device to the coil of one of the power solenoids thereby keeping one of the fixed resistors in the power circuit for a given period of time. A fault with this device is that it is effective only during overloads caused by rapid acceleration from rest, and also the device is sensitive only to a time delay period. Regardless of load current flowing the device will trigger the solenoid after the prescribed time has expired and thereby allow further increases in current draw from the batteries, even if the overload condition still exists.

Another device often used to prevent excessive current flow is a thermal switch which senses the temperature of some electrical components, usually the drive motor, and switches off the power circuit if the temperature exceeds a predetermined value. A drawback of this device is the time-lag required for the temperature build-up in the electrical motor and the thermal sensing device to switch the device to an activated condition, and also the time required for cooling off the thermal device to reset it.

SUMMARY OF THE INVENTION

A device is provided for limiting the maximum power current flow in an electric powered vehicle. The current limiting device comprises a low power voltage relay, having its control coil connected in parallel with a shunt wire of known resistance. The shunt wire with the parallel connected low power relay coil is inserted in a series connection with the main power load circuit. As the accelerator foot pedal of the electric vehicle is depressed, the foot pedal controlled on/off switches are closed and thereby activate the coils of the power solenoids, which closes their normally open contacts and bypasses the associated current controlling resistors. As the current controlling resistors are shorted from the power circuit the load current flow can now increase on demand from the drive motor. The load current flow passes through the series connected shunt, and a small percentage, depending on the ratio of the shunt resistance to low power relay coil resistance, passes through the low power relay coil. As the current in the power circuit increases the amount flowing through the low power relay coil will also increase a proportional amount until at some predetermined load current flow the current flowing through the low power relay coil is sufficient to activate its relay switch. This shunt relay switch has a set of normally closed contacts connected in series with the coil of one of the power circuit solenoids. When its normally closed contacts open, and the shunt relay is activated, the coil of the associated power solenoid is thereby deenergized. This causes this power solenoid contacts to open. When these contacts of the power solenoid open the associated control current resistor is electrically inserted back into the power circuit. The effect this has is to restrict the amount of current flowing in the power circuit from the battery during the particular load application, since the resistor now places a voltage loss on the motor. As long as the foot accelerator pedal remains depressed and all of the foot pedal control switches remain closed while this load application exists, the current control resistor inserted by activation of a shunt relay switch will remain in the power circuit to limit the flow of load current from the batteries.

If the foot accelerator remains depressed keeping the foot control switches closed, and the overload condition diminishes, then current flow in the power circuit will decrease. Also, flow in the shunt relay coil will decrease. As load current decreases at a predetermined current value, the shunt relay will deactivate and the contact of the shunt relay switch will again close and thereby reenergize the coil of the associated power solenoid relay. Energizing the power solenoid relay will close its normally open contacts which bypass its current control resistor and allow the motor to see full battery voltage again.

The device disclosed in the instant application surpasses other prior art construction used for achieving current control both in cost and performance. The estimated cost of the new current sensor relayed system is considerably less than prior art devices.

In a modification of the present invention an electric lamp is provided which indicates when a current overload condition exists. This can easily be accomplished by using a single pole double throw relay, connected in parallel with the shunt. Thus one side of the shunt relay switch, which feeds the coil of the power relay, is normally closed, while the other side which feeds the electric indicating lamps is normally open. When the shunt relay coil switch is activated, due to excessive overload current, the normally closed contacts open and cut off electric power to the coil of the power solenoid relay thereby reintroducing a current control resistor into the power circuit, and limiting load current flow. At the same time the normally open side of the shunt relay switch now closes and completes the lamp circuit. The lamp becomes illuminated and serves as a warning to the vehicle operators that the electric vehicle is being used in an overload situation.

BRIEF DESCRIPTION OF THE DRAWING

For a better understanding of the invention reference may be had to the preferred embodiment exemplary of the invention shown in the accompanying drawings in which.

DESCRIPTION OF THE PREFERRED EMBODIMENT

Figure 1:
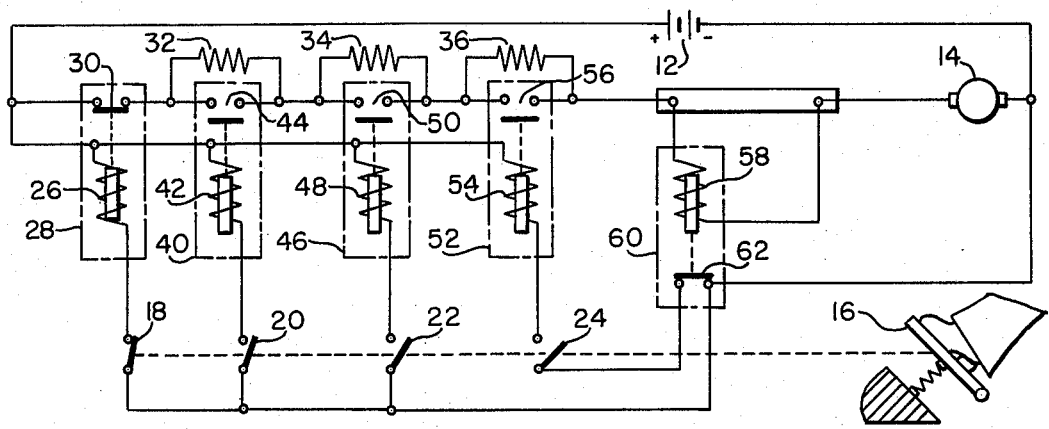
FIG. 1 is a schematic view of the power circuit for an electric vehicle embodying the teaching of the present inventor.

Referring now to the drawings and more particularly to FIG. 1, there is shown an electric circuit 10, for an electric vehicle, embodying the teachings of the present invention. Electric circuit 10 comprises a direct current power source, which is generally a battery 12, for supplying power to the electric vehicle and an electric motor 14 for driving the electric vehicle. The speed of the electric vehicle is regulated by depressing or releasing accelerator pedal 16. Depressing the speed control foot pedal 16 sequentially closes foot control switch 18, foot control switch 20, foot control switch 22, and foot control switch 24. Speed control pedal 16 is mechanically connected to foot control switches 18, 20, 22 and 24. As foot switch 16 is initially depressed switch 18 closes energizing coil 26 of power relay 28. Power relay 28 contains a set of normally open contacts 30 which are in series with the drive motor 14 of the power circuit 10. When the normally open contacts 30 first close power is fed to drive motor 14, through fixed resistors 32, 34, 36, and through shunt 38. Control resistors 32, 34, and 36 limit the current flowing through the electric vehicle power circuit 10 and through the drive motor 14. As the foot speed control pedal 16 is further depressed switch 20 closes energizing the coil 42 of power relay 40 so as to close normally open contacts 44. When contacts 44 close current control resistor 32 is shorted out of the circuit and increased current flows through drive motor 14.

As foot speed control pedal 16 is further depressed switch 22 is closed energizing coil 48 of relay 46 which closes normally open contacts 50 shorting out current control resistor 34, allowing the load current to increase. When the speed control foot pedal 16 is completely depressed switch 24 is closed energizing coil 54 of power relay 52 to close normal open contacts 56 shorting out fixed resistor 36. At this point all control resistors 32, 34 and 36 are shorted out and no longer limit the amount of load current flowing. With all of the control resistors 32, 34 and 36 shorted out the amount of load current flowing is controlled mainly by the impedance of the drive motor 14.

At certain times when this speed control foot pedal 16 is completely depressed such as during initial acceleration, during high overload conditions or when the direction of the electric vehicle is being reversed large current overload and large current drain on the battery 12 can occur. The excessive current can be detrimental to the batteries 12 and the electric power system 10, and motor 14. To prevent the high current overload the coil 58 of the shunt control relay 60 is connected in parallel with the wire shunt 38. Depending upon the resistance value of the shunt 38 a small portion of the load current is passed through the coil 58 of relay 60. When the current in the power circuit 10 increases, the current through coil 58 of relay switch 60 will increase a proportionate amount until at some predetermined overload value sufficient current is flowing to activate relay 60 and open the associated normally closed contacts 62. Normally closed contacts 62 are connected in series with switch 24 and the coil 54 of relay 52, which controls shorting of control resistor 36. When relay 60 is energized, normally closed contacts 62 open deenergizing coil 54 of relay 52 opening contacts 56 and electrically reintroducing control resistor 36 into the power circuit 10. The load current is then forced to flow through the control resistor 36 which limits the amount of current flowing in the load circuit to a safe value.

Figure 2:
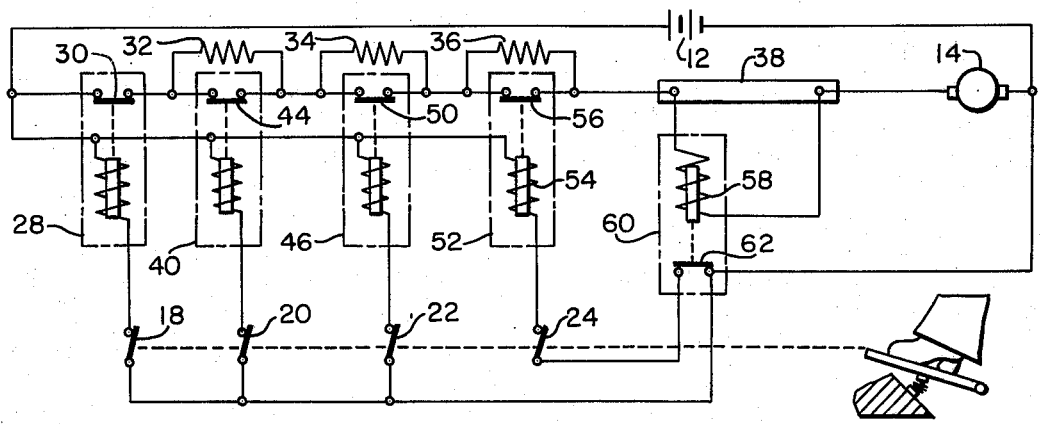
FIG. 2 is a view similar to FIG. 1 showing the accelerator pedal depressed and the current control resistors bypassed.
Figure 3:
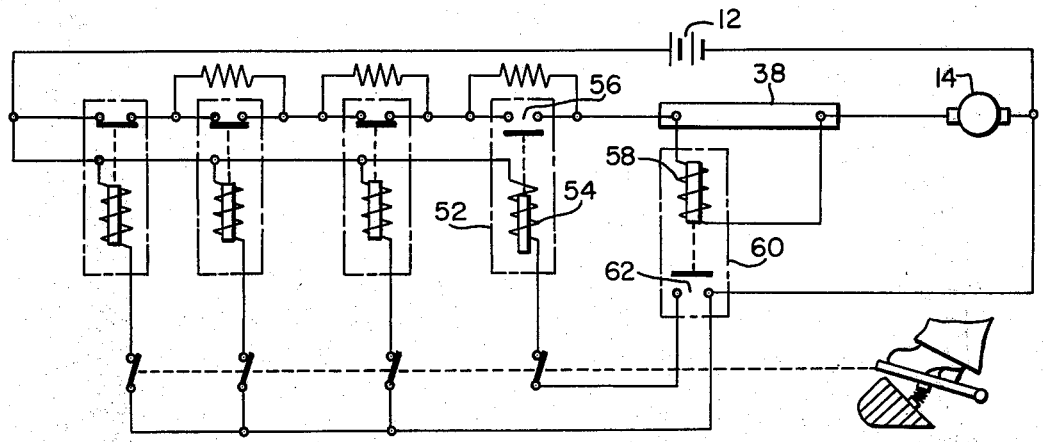
FIG. 3 is a view similar to FIG. 2 showing the operation of the current limiting apparatus during overload conditions.

As shown in FIG. 2 when the foot pedal 16 is completely depressed switches 18, 20, 22 and 24 are under normal operating conditions closed and control resistor 32, 34, 36 are shorted out of the load circuit 10. When under overload operating conditions, as shown in FIG. 3, the current flowing through coil 58 exceeds a predetermined value contacts 62 are open and control resistor 36 is electrically reinserted into the circuit to limit the amount of load current flowing. If the foot speed control switch 16 remains depressed closing switches 18, 20, 22, 24 and the overload condition is removed then current flowing in the power circuit will be reduced and the amount of current flowing through control coil 58 will reduce proportionately until, at some predetermined level, control relay 60 will deactivate allowing contacts 62 to return to a normally closed position. When contacts 62 return to the normally closed position coil 54 of relay 52 will be reenergized opening contacts 56 and allowing load current to flow without being impeded by control resistor 36. If at any time a current overload condition again occurs coil 58 will be reenergized and the sequence of operations, electrically reintroducing control resistor 36, will be repeated, so as to limit the maximum load current flowing.

Figure 4:
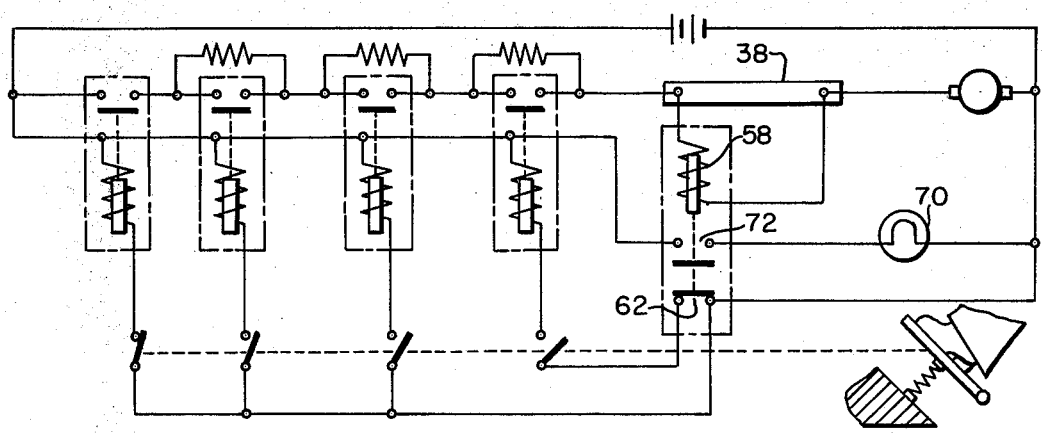
FIG. 4 is similar to FIG. 1 with the addition of an indicating lamp to warn of existing overload operation.

Referring now to FIG. 4 there is shown a further modification of this current limiting system. The modification comprises, an indicating light 70 which is energized when a set of normally open contacts 72 close. Normally open contacts 72 are controlled by shunt relay coil 58 so as to close when control relay 60 is energized. Contacts 62 and 72 can be formed from a single pole double throw set of contacts so that when coil 68 is energized, and picks up contacts 62 to inserting resistor 36, at the same time contacts 72 closes activating lamp 70. Lamp 70 is mounted inside the electric vehicle in a position to be readily observable by the vehicle operator. When lamp 70 becomes energized it serves as a warning to the vehicle operator that the vehicle is being used in an overload situation.

I claim:

1. A battery powered electric vehicle having an electric circuit controlling current flow to the vehicle drive motor comprising:
    a plurality of fixed resistors, connected in series, disposed between the battery and the vehicle drive motor;
    a plurality of switches, switchable between an open position and a closed position, each of said plurality of switches being connected in parallel with at least one of said plurality of fixed resistors to short out the associated resistor when in the closed position;
    a throttle, movable between a raised position and a depressed position, connected to said plurality of switches for sequentially switching said plurality of switches to the closed position as said throttle is depressed;
    resistor reinsertion means for opening the last of said plurality of switches to close and electrically reinserting the last resistor to be shorted out when said throttle is depressed, shorting out all of said plurality of fixed resistors, and then current exceeds a predetermined value; and,
    resistor maintaining means for keeping open the last of said plurality of switches, which is closed as said throttle is depressed with current below the predetermined level, and electrically maintaining the last of the plurality of fixed resistors in series with the drive motor when current exceeds the predetermined value and then said throttle is depressed.

2. A battery powered electric vehicle as claimed in claim 1 comprising:
    a motor disconnecting switch means, switchable between a closed position and an open position, disposed in series with the battery and the drive motor to disconnect the battery from the drive motor when open;
    said throttle connected to switch said motor disconnecting switch means to the open position when raised; and,
    biasing means biasing said throttle to the raised position.

3. A battery powered vehicle as claimed in claim 1 wherein:
    each of said plurality of switches are controlled by a solenoid;
    a plurality of control switches, each being movable between an on position activating one of the solenoids and an off position deenergizing the solenoid; and,
    said throttle comprises a foot pedal which sequentially closes said plurality of control switches as depressed.

4. A battery powered electric vehicle as claimed in claim 3 comprising:
    a shunt connected in series between the battery and drive motor;
    a low power relay having a normally closed set of contacts and an operating coil;
    said operating coil being connected in parallel with said shunt so that when a predetermined current value is exceeded the operating coil is energized and the normally closed contacts open; and,
    the normally closed contacts connected in series with the last of said plurality of control switches to be closed as said foot pedal is depressed so that with the normally closed contacts open the last of said plurality of fixed resistors which can be shorted out is disposed in series with the battery and the drive motor.

5. Current limiting apparatus as claimed in claim 4, including:
    luminary means connected to said current responsive means so as to be activated as a predetermined value of overload current.

6. Current limiting apparatus as claimed in claim 5, wherein
    said luminary means comprises:
    a lamp;
    a set of normally open contacts connected in series with said lamp; and
    said set of normally open series connected contacts being controlled by said current responsive means so as to be activated at a predetermined current level.

7. An electric vehicle comprising:
    a power source;
    a drive motor;
    a plurality of fixed resistors disposed in series between said power source and said drive motor;
    a current limiting resistor disposed in series with said plurality of fixed resistors;
    a plurality of shorting switches disposed in parallel with said plurality of fixed resistors;
    a current limiting resistor switch disposed in parallel with said current limiting resistor to short out said current limiting resistor when closed;
    a solenoid controlled opening and closing of said current limiting resistor switch;
    throttle means movable between a raised position and a depressed position connected to sequentially close said plurality of shorting switches as depressed;
    a throttle switch, connected in series with said solenoid, movable between an open and closed position and being connected to said throttle means to be closed when said throttle means is fully depressed; and, a current responsive switch, connected in series with said throttle switch, switchable from a closed position to an open position when current flow to the drive motor exceeds a predetermined value.

8. An electric vehicle as claimed in claim 7 comprising:
disconnect switch means disposed between said power source and said drive motor to stop power flow to said drive motor when open;
said throttle means connected to said disconnect to open said disconnect when raised; and,
biasing means urging said throttle to a raised position.

9. An electric vehicle as claimed in claim 7 wherein said current responsive switch comprises a current shunt disposed in series between said drive motor and said power source.

* * * * *